(12) United States Patent
O'Neill et al.

(10) Patent No.: US 11,739,274 B2
(45) Date of Patent: Aug. 29, 2023

(54) METAL-ORGANIC FRAMEWORK CATALYSTS AND THEIR USE THEREOF IN CATALYTIC CRACKING

(71) Applicant: ExxonMobil Technology and Engineering Company, Annandale, NJ (US)

(72) Inventors: Brandon J. O'Neill, Spring, TX (US); Joseph M. Falkowski, Hampton, NJ (US); Allen W. Burton, Stewartsville, NJ (US); Scott J. Weigel, Allentown, PA (US)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/634,962

(22) PCT Filed: Jul. 14, 2020

(86) PCT No.: PCT/US2020/041868
§ 371 (c)(1),
(2) Date: Feb. 12, 2022

(87) PCT Pub. No.: WO2021/034426
PCT Pub. Date: Feb. 25, 2021

(65) Prior Publication Data
US 2022/0290057 A1    Sep. 15, 2022

Related U.S. Application Data

(60) Provisional application No. 62/889,133, filed on Aug. 20, 2019.

(51) Int. Cl.
*C10G 47/10*      (2006.01)
*B01J 31/16*      (2006.01)

(52) U.S. Cl.
CPC .......... *C10G 47/10* (2013.01); *B01J 31/1691* (2013.01); *C10G 2300/4006* (2013.01);
(Continued)

(58) Field of Classification Search
CPC ......... C10G 11/02–18; C10G 47/02–10; B01J 31/1691
See application file for complete search history.

(56) References Cited

U.S. PATENT DOCUMENTS 4,943,366 A    7/1990  Fischer et al.
9,205,416 B2  12/2015  Burton et al.
(Continued)

FOREIGN PATENT DOCUMENTS

CN    105396618 A    3/2016

OTHER PUBLICATIONS

English machine translation of CN 105396618 (Year: 2016).*
(Continued)

*Primary Examiner* — Renee Robinson
(74) *Attorney, Agent, or Firm* — C. Tumey Law Group PLLC

(57) ABSTRACT

A hydrocarbon feed stream, particularly one comprising heavier hydrocarbons, may be converted to valuable products such as motor gasoline and/or lubricating oil by employing one or more MOF catalysts, which may be prepared from a precursor metal-organic framework (MOF). A MOF catalyst may be prepared by exchanging one or more organic linking ligands of the precursor MOF for an organic linking ligand having a different acidity and/or electron-withdrawing properties, which, in turn, may affect catalytic activity.

27 Claims, 4 Drawing Sheets

(52) U.S. Cl.
CPC . *C10G 2300/4012* (2013.01); *C10G 2300/70* (2013.01); *C10G 2400/02* (2013.01)

(56) References Cited

U.S. PATENT DOCUMENTS

| | | |
|---|---|---|
| 9,415,381 B2 | 8/2016 | Burton |
| 9,682,945 B2 | 6/2017 | Burton et al. |
| 10,005,074 B2 | 6/2018 | Burton et al. |
| 10,195,600 B2 | 2/2019 | Podsiadlo et al. |
| 10,252,918 B2 | 4/2019 | Schmitt et al. |
| 10,307,747 B2 | 6/2019 | Falkowski et al. |
| 10,427,147 B2 | 10/2019 | Burton et al. |
| 10,500,576 B2 | 12/2019 | Falkowski et al. |
| 10,518,257 B2 | 12/2019 | Falkowski et al. |
| 10,576,464 B2 | 3/2020 | Burton et al. |
| 10,662,068 B2 | 5/2020 | Burton et al. |
| 10,676,368 B2 | 6/2020 | Burton et al. |
| 10,696,558 B2 | 6/2020 | Falkowski et al. |
| 10,710,889 B2 | 7/2020 | Schmitt et al. |
| 10,710,890 B2 | 7/2020 | Burton et al. |
| 10,995,286 B2 | 5/2021 | Gatt et al. |
| 11,014,067 B2 | 5/2021 | Weston et al. |
| 11,230,515 B2 | 1/2022 | Ide et al. |
| 11,352,571 B2 | 6/2022 | Deimund et al. |
| 11,364,479 B2 | 6/2022 | Falkowski et al. |
| 11,433,386 B2 | 9/2022 | Shekhar et al. |
| 2014/0336394 A1 | 11/2014 | Burton et al. |
| 2015/0166431 A1* | 6/2015 | Lippmann .............. C10G 11/18 502/328 |
| 2016/0038929 A1 | 2/2016 | Kolb et al. |
| 2016/0039779 A1 | 2/2016 | Burton et al. |
| 2016/0060129 A1 | 3/2016 | Burton et al. |
| 2016/0102590 A1 | 4/2016 | Weiss et al. |
| 2018/0318815 A1 | 11/2018 | Falkowski et al. |
| 2018/0318816 A1 | 11/2018 | Falkowski et al. |
| 2019/0030518 A1 | 1/2019 | Burton et al. |
| 2019/0031519 A1 | 1/2019 | Burton et al. |
| 2019/0309231 A1 | 10/2019 | O'Neill et al. |
| 2020/0055797 A1 | 2/2020 | Deimund et al. |
| 2020/0179913 A1 | 6/2020 | Ide et al. |
| 2020/0290027 A1 | 9/2020 | O'Neill et al. |
| 2020/0385322 A1 | 12/2020 | Loveless et al. |
| 2021/0008747 A1 | 3/2021 | O'Neill et al. |
| 2021/0300842 A1 | 9/2021 | O'Neill et al. |
| 2022/0023827 A1 | 1/2022 | Mabon et al. |
| 2022/0048929 A1 | 2/2022 | Abney et al. |
| 2022/0176343 A1 | 6/2022 | Weston et al. |
| 2022/0290057 A1 | 9/2022 | O'Neill et al. |

OTHER PUBLICATIONS

Katz et al., A facile synthesis of UiO-66, UiO-67 and their derivatives, The Royal Society of Chemistry, Aug. 9, 2013.
International Search Report for International application No. PCT/US2020/041868 dated Sep. 8, 2020.

* cited by examiner

METAL-ORGANIC FRAMEWORK CATALYSTS AND THEIR USE THEREOF IN CATALYTIC CRACKING

CROSS-REFERENCE TO RELATED APPLICATIONS

This application is the 35 USC § 371 National State Application for PCT Application Number PCT/US2020/041868, filed on Jul. 14, 2020, which claims the benefit of U.S. Provisional Application No. 62/889,133, filed on Aug. 20, 2019, the entire contents of both of which are incorporated herein by reference.

BACKGROUND OF THE INVENTION

This application relates to methods and systems for the conversion of hydrocarbon feedstocks, in particular, heavier vacuum gasoil (VGO) distillate-range hydrocarbons, into fuel distillate-range hydrocarbon product streams, the product streams being characterized by a $T_{95}$ distillation temperature less than the $T_{95}$ distillation temperature of the hydrocarbon feed stream, the methods and systems involving the use of a metal-organic framework catalyst (MOF catalyst) comprising metal-organic framework.

Catalytic cracking (e.g., hydrocracking, fluid catalytic cracking) has been an important process for decades, enabling conversion of low value, heavy hydrocarbons derived from crude oil into valuable products such as gasoline, diesel fuel, and lubricants. Catalytic cracking utilizes a catalyst to facilitate hydrocarbon cracking. A cracking catalyst typically includes a metal function and an acid function.

Hydrocracking, which is performed in the presence of hydrogen, has recently become a subject of considerable interest in the petroleum industry because of advantages that it offers over conventional catalytic cracking operations. Chemically, hydrocracking may be considered a combination of hydrogenation and catalytic cracking where high-boiling hydrocarbons are to lower boiling fractions and olefinic and aromatic hydrocarbons are hydrogenated to generate paraffins and naphthenes.

Hydrocracking typically employs catalysts comprising zeolites, which are materials based on silica ($SiO_4^{4-}$) and alumina ($AlO_4^{5-}$) in combination with counter cations, such as sodium, potassium, calcium, magnesium, and the like. Much of the catalysis of the necessary reactions occurs within the zeolite's pores. The selectivity and activity of a zeolitic catalyst are highly dependent on the mass diffusion of the hydrocarbons from the hydrocarbon feed stream into and out of the pores of the zeolite. Amorphous silica-alumina (Si/Al) is also a commonly used hydrocracking catalyst and has pores with dimensions in excess of 10 nm, allowing access for large molecules; however, Si/Al catalysts exhibit lower catalytic activity than zeolites and therefore, are not preferred in hydrocracking processes.

Another type of material finding use in catalysis are metal-organic frameworks (MOFs). In contrast with zeolites, MOFs are constructed from organic linking ligands that remain intact throughout the synthesis. Zeolite synthesis often makes use of a "template." Templates are ions that influence the structure of the growing inorganic framework. Typical templating ions are quaternary ammonium cations, which are removed later. In MOFs, the framework is templated by the SBU (secondary building unit, often containing a metal atom) and the organic ligands. Both the metal in the SBU as well as any functionality given to an organic ligand provides a potential for a catalytic site that is highly tunable with nearly limitless variations. However, their application in refining has not yet been realized due at least in part to their apparent limited stability to temperatures and pressures. Thus, a MOF-based catalyst exhibiting both catalytic activity in cracking as well as stability in the temperatures and pressures commonly used in cracking reactors would provide an advantageous asset to the industry.

SUMMARY OF THE INVENTION

This application relates to methods and systems for the conversion of hydrocarbon feedstocks, in particular, heavier vacuum gasoil (VGO) distillate-range hydrocarbons, into fuel distillate-range hydrocarbon product streams, the product streams being characterized by a $T_{95}$ distillation temperature less than the $T_{95}$ distillation temperature of the hydrocarbon feed stream, the methods and systems involving the use of a metal-organic framework catalyst (MOF catalyst) comprising metal-organic framework.

Provided herein are methods for converting hydrocarbons. One method for converting hydrocarbons includes: providing a catalyst having a metal-organic framework structure; and contacting a hydrocarbon feed stream with the catalyst under conditions effective convert the hydrocarbon feed stream to a hydrocarbon product stream, the product stream characterized by a $T_{95}$ distillation temperature less than the $T_{95}$ distillation temperature of the hydrocarbon feed stream.

Provided herein is a system for converting hydrocarbons comprising: at least one reactor, the reactor comprising: a hydrocarbon feed stream inlet arranged and configured to convey a hydrocarbon feed stream into the reactor; a hydrocarbon product stream outlet arranged and configured to convey a hydrocarbon product stream out of the reactor; at least one catalyst bed comprising at least one MOF catalyst, wherein the MOF catalyst comprises metal-organic framework.

BRIEF DESCRIPTION OF THE DRAWINGS

The following figures are included to illustrate certain aspects of the disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
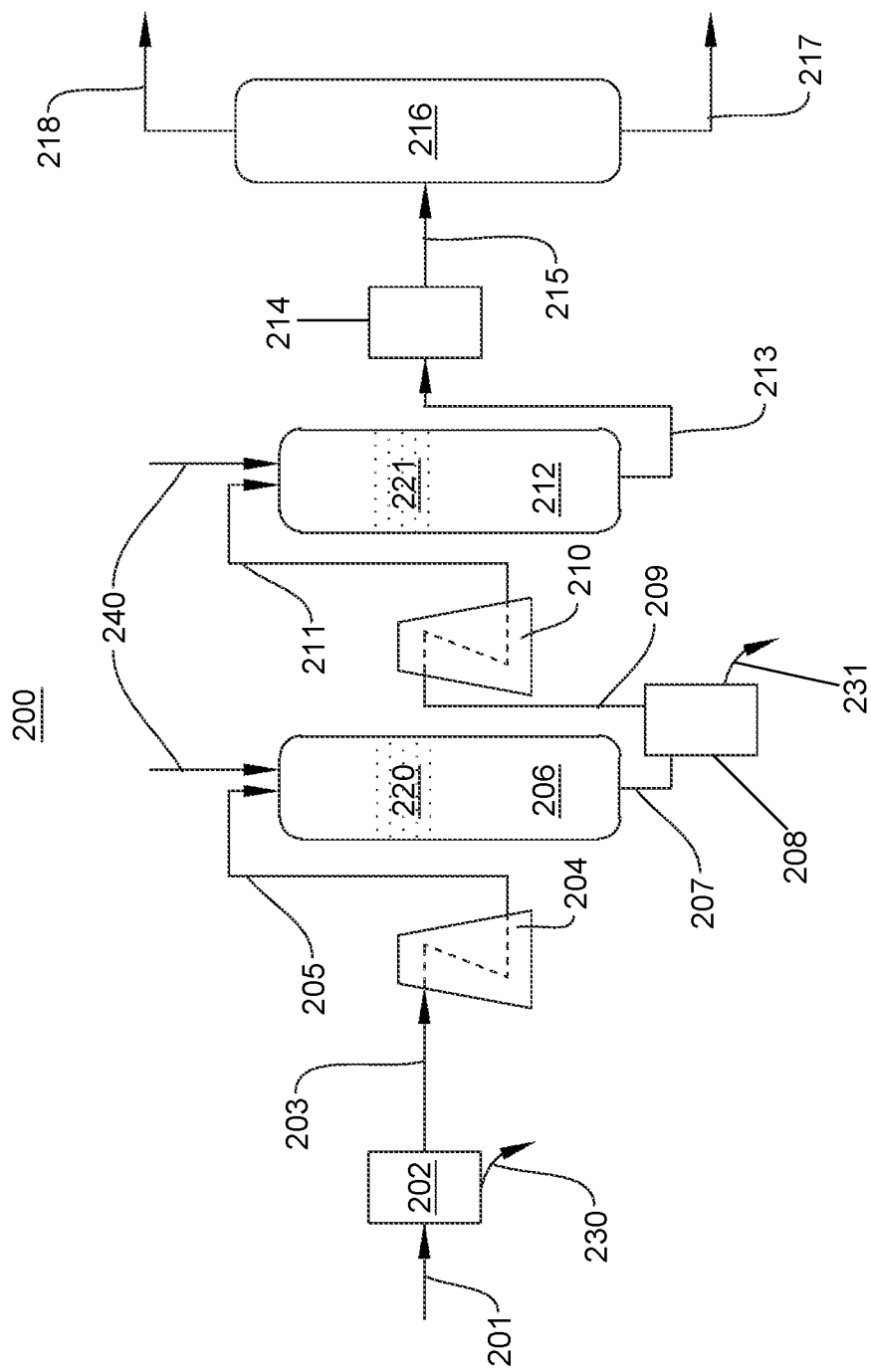
FIG. 1 shows an example of a system suitable for converting a hydrocarbon feedstock as described herein.

This application relates to methods and systems for the conversion of hydrocarbon feedstocks, in particular, heavier vacuum gasoil (VGO) distillate-range hydrocarbons, into fuel distillate-range hydrocarbon product streams, the product streams being characterized by a $T_{95}$ distillation temperature that is lower than the $T_{95}$ distillation temperature of the hydrocarbon feed stream, the methods and systems involving the use of metal-organic framework catalyst (MOF catalyst) comprising metal-organic framework.

Metal-organic frameworks (MOFs) are a relatively new class of porous, crystalline materials made up of metal ion/oxide secondary binding units (SBUs) interconnected by organic linking ligands. MOFs are characterized by low densities, high internal surface areas, and uniformly sized pores and channels, making them ideal for a variety of applications, including catalysis. Due to the nearly infinite combination of organic linking ligands and secondary building units available, MOFs are highly tunable depending on the desired application. However, MOFs are typically unstable in extreme environments, undergoing phase transitions and/or becoming amorphous when exposed to high pressures and/or high temperatures. Thus, their use in the high-pressure environment of a hydrocracking reactor has not been investigated.

Surprisingly, we have identified the use of several MOFs having improved pressure stability, making them suitable for high-pressure applications such as hydrocracking, as disclosed herein. Discovery of catalysts that exhibit both measurable hydrocracking activity and stability is surprising and unexpected, given the history of MOF instability in extreme environments. Methods and systems for using these catalysts to convert hydrocarbon feed streams to hydrocarbon product streams being characterized by a $T_{95}$ distillation temperature that is lower than the $T_{95}$ distillation temperature of the hydrocarbon feed stream are disclosed below.

To facilitate an understanding of the present invention, a number of terms and phrases are defined below.

As used in the present disclosure and claims, the singular forms "a," "an," and "the" include plural forms unless the context clearly dictates otherwise.

The term "and/or" as used in a phrase such as "A and/or B" herein is intended to include "A and B", "A or B," "A," and "B."

As used herein, "hydroprocessing" and any grammatical variations thereof, refers to a process utilizing hydrogen to treat a hydrocarbon feedstock. This includes, but is not limited to, hydrotreating, hydrocracking, catalytic dewaxing, and hydrofinishing/aromatic saturation.

As used herein, "hydrotreating" and grammatical variations thereof, refers to a process that removes contaminants such as nitrogen, sulfur, oxygen, other heteroatoms, metals, and aromatics, from hydrocarbon feedstock by treating with hydrogen. Hydrotreating may also convert olefins and aromatics to saturated compounds. Examples of hydrotreating include, but are not limited to, hydrogenolysis (e.g., hydrodesulfurization, hydrodenitrogenation, hydrodeoxygenation, hydrodemetallization, hydrodeasphalteneization) and hydrogenation (e.g., olefin saturation, aromatic saturation (hydrodearomatization)).

As used herein, "catalytic cracking" and grammatical variations thereof, refers to a process of converting a higher boiling range hydrocarbon feedstock to a lower boiling range hydrocarbon feedstock in the presence of a catalyst that facilitates the conversion.

As used herein, "hydrocracking" and grammatical variations thereof, refers to a process of converting a higher boiling range hydrocarbon feedstock to a lower boiling range hydrocarbon feedstock in the presence of hydrogen. The reactions that may occur include breaking bonds in larger molecules to produce smaller molecules as well as rearrangement of the atoms in the molecules themselves.

A hydrocarbon composition (e.g., a hydrocarbon feedstock) will have a characteristic distillation profile defined by the percent (or fraction) of the composition that boils at or below a particular temperature. For example, a $T_5$ temperature refers to the temperature at which 5% of the hydrocarbon composition boils. Similarly, a $T_{95}$ distillation temperature refers to the temperature at which 95% of the hydrocarbon composition boils. Distillation profiles for a feed can be determined according to ASTM D2887-18.

As used herein, a particular fraction of a feedstock may be referred to by its $T_5$-$T_{95}$ distillation temperature range, either as an explicit range or as an upper or lower limit. For example, a 650° F. (343° C.) to 720° F. (382° C.) fraction may be characterized by a $T_5$-$T_{95}$ range of 650° F. (343° C.) to 720° F. (382° C.). In another example, a 720° F.− (382° C.−) fraction is defined by hydrocarbons having a $T_{95}$ temperature of 720° F. (382° C.). Similarly, a 650° F.+(343° C.+) fraction is defined by hydrocarbons having a $T_5$ temperature above 650° F. (343° C.).

As used herein, a particular fraction of a feedstock may be referred to by the number of carbon atoms in the molecules making up the fraction. The number of carbon atoms may be described either by an explicit range or as an upper or lower limit. For example, a $C_{4-}$ fraction contains hydrocarbons having four or fewer carbon atoms. In another example, a $C_{5+}$ fraction contains hydrocarbons having five or more carbon atoms. A $C_2$-$C_4$ fraction contains hydrocarbons having two, three, or four carbon atoms.

As used herein, "fraction" refers to a portion of a hydrocarbon composition that is identifiable by a particular property, such as boiling range, number of carbon atoms, and/or molecular weight range. A fraction may have been separated from the hydrocarbon composition or it may still be a part of the hydrocarbon composition.

As used herein, liquid petroleum gas (LPG) refers to a hydrocarbon composition, the majority of which is propane and butane (including n-butane and isobutane).

As used herein, "vacuum gasoil," "VGO," "vacuum gas-oil-range," and grammatical variations thereof, refer to a hydrocarbon composition characterized by a $T_5$ of about 644° F. (340° C.) to about 662° F. (350° C.) and a $T_{95}$ range of about 1030° F. (555° C.) to about 1058° F. (570° C.).

As used herein, "distillate fuel," "distillate boiling range," "distillate fuel fraction," and grammatical variations thereof refer to a hydrocarbon composition characterized by a $T_5$-$T_{95}$ distillation temperature range of about 400° F. (2043° C.) to about 650° F. (343° C.) or 680° F. (360° C.).

As used herein, "MOF catalyst" refers to a catalyst derived from a MOF as will be described herein. As used herein, "MOF" refers to metal-organic framework characterized by single metal ions or metal clusters linked by organic linking ligands to form one-, two-, or three-dimensional structures. MOFs are porous coordination polymers. A MOF catalyst may contain modified MOF derived from precursor MOF. A MOF catalyst may be prepared, for example, by exchanging one or more of the organic linking ligands in a precursor MOF. As used herein, "native ligand" refers to the organic linking ligand/s present in the precursor MOF. An "exchange ligand" refers to an organic linking ligand/s that replaces one or more of the native ligands in the precursor MOF to generate a modified MOF. While the term "replace" and "exchange" is used herein, these terms do not limit the preparation of a modified MOF or a MOF catalyst to include replacement or exchange of organic linking ligands. Alternatively, a modified MOF may be synthesized to include both "native" and "exchange" ligands. The modified MOF may be incorporated into a MOF catalyst, as will be described below.

As used herein, "isostructural" is given its common meaning in the art and refers to crystals having the same structure, but not necessarily the same chemical composition or cell dimensions. As used herein, "isomorphous" is given its common meaning in the art and refers to isostructural crystals having the same cell dimensions (and therefore generates the same PXRD pattern).

As used herein, "conditions effective" refers to conditions to which a hydrocarbon feed stream is subjected such that the hydrocarbon feed stream is sufficiently converted into a hydrocarbon product stream. Conditions may include temperature, pressure, reaction time, and the like, which are conditions known to those of ordinary skill in the art with the benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

To facilitate a better understanding of the embodiments of the present invention, the following examples of preferred or representative embodiments are given. In no way should the following examples be read to limit, or to define, the scope of the invention.

More illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods may also "consist essentially of" or "consist of" the various components and steps.

Disclosed herein are methods and systems for converting hydrocarbons. Suitable methods include a method comprising: providing a MOF catalyst comprising molecular organic framework; and contacting a hydrocarbon feed stream with the MOF catalyst under conditions effective convert the hydrocarbon feed stream to a hydrocarbon product stream, the product stream being characterized by a $T_{95}$ distillation temperature that is lower than the $T_{95}$ distillation temperature of the hydrocarbon feed stream.

Hydrocarbon Feed Streams

The methods and system described herein may be suitable for converting a hydrocarbon feed stream comprising hydrocarbons having a $T_5$ value at or above about 392° F. (200° C.). Suitable hydrocarbon feed streams include those derived from, but not limited to, straight run (atmospheric) gas oils, demetallized oils, coker distillates, cat cracker distillates, heavy naphtha, bio-diesel, Fischer-Tropsch wax, and any blend thereof.

A hydrocarbon feed stream suitable for conversion with a MOF catalyst may have no detectable nitrogen content to about 50 wppm (50 mg/L) nitrogen, but preferably has a nitrogen content less than about 5 wppm (5 mg/L). A hydrocarbon feed stream suitable for conversion with a MOF catalyst may have no detectable sulfur content to about 50 wppm (50 mg/L) sulfur, but preferably has a sulfur content of less than about 10 wppm (10 mg/L). A hydrocarbon feed stream having a higher sulfur and/or nitrogen content may be pre-treated, as described above, in a pre-treatment stage to reduce the sulfur and/or nitrogen content prior to contacting the hydrocarbon feed stream with one or more MOF catalysts.

Reactor Conditions

Using the systems and methods described herein, a hydrocarbon feed stream may be contacted with a MOF catalyst under conditions effective to generate a hydrocarbon product stream. The contacting of the hydrocarbon feed stream take place in a reactor, for example, in a catalyst bed. The catalyst bed may be a fixed bed or a moving bed. The conditions may additionally include providing hydrogen to the reactor. Suitable reactor temperatures include 200° C. to 450° C., which includes, for example, 315° C. to 425° C. Suitable reactor pressures include 250 psig (about 1720 kPa) to 5000 psig (about 34470 kPa), which includes 500 psig (about 3450 kPa) to 3000 psig (about 20680 kPa) and 800 psig (about 5516 kPa) to 2500 psig (about 17240 kPa). Suitable LHSVs include 0.1 hour$^{-1}$ to 10 hours$^{-1}$. Suitable hydrogen treat rates include 200 scf/B (35.6 m$^3$/m$^3$) to 10,000 scf/B (1781.08 m$^3$/m$^3$) which includes 500 (89.1 m$^3$/m$^3$) to 10,000 scf/B (1781.08 m$^3$/m$^3$).

Hydrocarbon Product Streams

The methods and system described herein may be suitable for converting a hydrocarbon feed stream to a hydrocarbon product stream comprising hydrocarbons having a $T_{95}$ distillation temperature that is lower than the $T_{95}$ distillation temperature of the hydrocarbon feed stream. Ideally, a hydrocarbon product stream contains distillate fuel-range hydrocarbons and/or lubricating oil-range hydrocarbons and contains a minimal amount of lighter hydrocarbons (e.g., $C_{4-}$ hydrocarbons). For example a hydrocarbon product stream may contain from about 50 wt. % to about 100 wt. %, from about 60 wt. % to about 100 wt. %, from about 70 wt. % to about 100 wt. %, from about 80 wt. % to about 100 wt. %, or from about 90 wt. % to about 100 wt. % distillate-fuel range hydrocarbons, lubricating oil-range hydrocarbons, or a combination thereof. A hydrocarbon product stream may be a result of, for example, cracking of paraffins into smaller hydrocarbons, ring opening of naphthenes into paraffins, hydrogenation and subsequent ring opening of aromatics, hydrogenation of isoparaffins, or a combination thereof. A hydrocarbon product stream may contain LPG, light naphtha, jet fuel, diesel boiling range distillate fraction, jet fuel boiling range distillate fraction, kerosene boiling range distillate fractions, or any blend thereof.

Systems and Methods for Converting a Hydrocarbon Feed Stream

The MOF catalysts disclosed herein may be suitable for converting a hydrocarbon feed stream. A hydrocarbon feed stream may be contacted with one or more MOF catalysts under conditions effective to convert the hydrocarbon feed stream to a hydrocarbon product stream having a lower $T_{95}$ than the hydrocarbon feed stream. The conditions effective may further include providing hydrogen to one or more reaction zone.

Systems for Converting Hydrocarbons

A system for performing the methods disclosed herein is also provided. A system may include, but is not limited to, a hydrocarbon feed stream, a hydrocarbon product stream, and at least one reactor in which the hydrocarbon feed stream may be contacted with a MOF catalyst, as described herein, under conditions effective to convert the hydrocarbon feed stream to the hydrocarbon product stream. The reactor includes at least one catalyst bed comprising a MOF catalyst. The at least one reactor has a hydrocarbon feed inlet constructed and arranged to receive the hydrocarbon feed stream and a hydrocarbon product outlet constructed and arranged to provide the hydrocarbon product stream. The at least one reactor may also include an inlet for providing hydrogen to the reactor. A system for converting a hydrocarbon feed stream may be part of a hydrocracking unit. The system may optionally include a pre-treatment stage upstream of the at least one reactor and/or a post-treatment stage downstream of the at least one reactor. A pre-treatment stage may be present to modify the disposition of a hydrocarbon feed stream for compatibility with downstream processes, for example, to remove sulfur, water, nitrogen, and/or the like. For example, a hydrocarbon feed stream may be treated to adjust sulfur to a level lower than about 500 wppm (50 mg/L) and/or nitrogen to a level lower than about 100 wppm (100 mg/L).

A post-treatment stage may be present to modify the disposition of a hydrocarbon product stream for conversion into a commercial product or for compatibility with a subsequent process, for example, naphtha reforming. A post-treatment stage may, for example, include catalytic or solvent de-waxing, sweet-stage hydrofinishing, distillation, and/or the like.

A reactor may include one or more catalyst beds. For example, two or more catalyst beds may be arranged in a stacked configuration. The one or more catalyst beds may be fixed or moving catalyst beds. At least one of the one or more catalyst beds contains a MOF catalyst. By way of a non-limiting example, a first catalyst bed in a stacked configuration may contain a MOF catalyst as disclosed herein. A second catalyst bed may contain a post-treatment catalyst, for example, a dewaxing catalyst.

Example Systems

FIG. 1 depicts a sample configuration of a system for converting hydrocarbons using at least one MOF catalyst as disclosed herein. The hydrocracking unit 200 in FIG. 1 includes a pre-treatment stage 202, a first heater 204, a first reactor 206, a first separation stage 208, a second heater 210, a second reactor 212, a post-treatment stage 214, and a final separation stage 216. A hydrocarbon feed stream 201 may be conveyed into a pre-treatment stage 202. Any waste, for example, water, hydrogen sulfide, ammonia, may be separated and discarded as a waste stream 230. Optionally, but not shown, a naphtha stream may be isolated as well. The pre-treated hydrocarbon feed stream 203 may be conveyed to the first heater 204 to warm the pre-treated hydrocarbon feed stream 203 and generating a warmed hydrocarbon feed stream 205. The warmed hydrocarbon feed stream 205 may then be conveyed through the first reactor 206 comprising a catalyst bed 220, generating an intermediate hydrocarbon stream 207. The intermediate hydrocarbon stream 207 may be conveyed through the first separation stage 208 where any undesirable fraction generated from reactions occurring in the first reactor 206 may be isolated and discarded as waste 231. For example, a $C_{4-}$ fraction may be discarded. The resulting cleaned intermediate hydrocarbon stream 209 may then be conveyed through the second heater 210 generating a warmed intermediate hydrocarbon stream 211. The warmed intermediate hydrocarbon stream 211 may then be conveyed to the second reactor 212 comprising a catalyst bed 221, generating a hydrocarbon product stream 213. The hydrocarbon product stream 213 may be conveyed to the post-treatment stage 214 generating a treated hydrocarbon product stream 215, which may then be conveyed to the final separation stage 216 to separate the treated hydrocarbon product stream 215 into two or more fractions 217, 218, which may include, but are not limited to, a lubricant fraction, a distillate fuel fraction, LPG, naphtha, a $C_{4-}$ fraction, a $C_{5+}$ fraction, and any blend thereof. A hydrogen-containing stream 240 may be conveyed into each of the reactors 206, 212. At least one of the catalyst beds 220, 221 contains a MOF catalyst as described herein.

The pre-treatment stage may include any apparatus necessary for modifying the disposition of a hydrocarbon feed stream. For example, the pre-treatment stage may include a sorbent, a hydrotreating reactor, an aromatic saturation catalyst, or any combination thereof.

The configuration shown in FIG. 1 depicts two reactors 206, 212, however, it is understood that a system for converting hydrocarbons may include any number of reactors. In any embodiment, any of the pre-treatment stage 202, the first heater 204, the first reactor 206, and first separation stage 208 are optional. In instances where any or multiple of these components are absent, the component directly upstream of the absent component/s is directly connected to the component directly downstream of the absent component/s.

A system for converting a hydrocarbon feed stream may additionally include apparatuses for controlling the various components of the system. For example, temperature/s pressure/s, liquid hourly space velocity (LHSV), weight hourly space velocity (WHSV), and/or the hydrogen treat rate may each be adjusted. Examples of system components that may be controlled include, but are not limited to, valves, heat exchangers, heaters, flow meters, and reactors. A system may optionally include one or more feedback loops comprising one or more processors and detectors.

MOF Catalysts & Example Methods of their Preparation

The MOF catalysts disclosed herein may be characterized by powder X-ray diffraction (PXRD), as will be described in detail below. PXRD analyses are collected with a Bruker D8 Endeavor diffraction system with a LYNXEYE detector, using copper K-alpha radiation. The diffraction data is recorded by step scanning at 0.02 degrees two-theta, where theta is the Bragg angle and uses an effective counting time of 2 seconds for each step.

The MOF catalysts disclosed herein may have enhanced acidity, which may be measured, for example, by its Alpha value. Alpha value is an approximate indication of the catalytic cracking activity of a catalyst of interest (e.g., a MOF catalyst) compared to a standard catalyst and gives the relative rate constant (rate of normal hexane conversion per volume of catalyst per unit time). It is based on the activity of silica-alumina cracking catalyst having an alpha value of 1 (Rate Constant=0.016 $s^{-1}$). The alpha test is described in U.S. Pat. No. 3,354,078; in the Journal of Catalysis, 4, 527 (1965); 6, 278 (1966); and 61, 395 (1980), each incorporated herein by reference with respect to its disclosure of how to carry out the Alpha test. The experimental conditions of the test used herein include a constant temperature of 1000° F.

(537.8° C.) and a variable flow rate as described in detail in the Journal of Catalysis, 61, 395.

The pore volume of a modified MOF or a MOF catalyst may be determined by the t-plot method, which is well known and understood in the art. The pore size of a modified MOF or a MOF catalyst may be determined by gas sorption (e.g., Barret, Joyner and Halenda (BJH) method via DIN 66134 (1998-02)). A MOF catalyst may have pores with a diameter greater than or equal to about 8 angstroms (Å). For example, a MOF catalyst (or the modified MOF therein) may have pores with a diameter of about 8 Å, about 9 Å, about 10 Å, about 11 Å, about 12 Å, or greater than about 12 Å.

The MOF catalysts described herein comprising metal organic framework. Several MOF catalysts characterized by $Zr_6O4(OH)_4$ octahedra connected by linking ligands comprising one or more of 1,4-phenylenedicarboxylate, 1,4-phenylenebisphosphonate, 4,4'-biphenylenedicarboxylate, perfluoro-4,4'-biphenylenebisphosphonate are also identified. The MOF catalysts are denoted herein as EMM-39(Zr), EMM-39(Zr)F, EMM-35, EMM-42(Cr), and EMM-42(Cr)F.

MOF catalysts suitable for use in the methods and systems described herein are prepared from precursor metal-organic framework. Precursor metal-organic framework may be modified to generate modified metal-organic framework, which may be further converted into a MOF catalyst. Modified metal-organic framework may be prepared by contacting precursor metal-organic framework in a liquid medium with a source of exchange ligands under conditions effective to remove one or more native ligands and replace each native ligand with an exchange ligand. The exchange ligand may be present in the liquid medium, for example, as the protonated form (i.e., the acid) or in salt form. The liquid medium may contain a solvent. The solvent may be a polar organic solvent, such as N,N-dimethylformamide (DMF), N,N-diethylformamide (DEF), N,N-dimethylacetamide (DMAc), 1,3-dimethylpropyleneurea (DMPU), a sulfoxide (e.g., dimethylsulfoxide or DMSO), a phosphoramide (e.g., hexamethylphosphoramide), an alcohol (e.g., butanol), acetonitrile (MeCN), triethylamine (TEA), or a combination thereof. Alternatively, though not strictly organic, aqueous solvents, such as aqueous ammonia and ethanol mixtures, can be used as a solvent for an exchange ligand.

The extent of exchange is reported herein as a molar ratio of the exchange ligand in the liquid medium to the native ligand in precursor metal-organic framework. In any example disclosed herein, the molar ratio of the exchange ligand to the native ligand may be from about 0.01 to about 10 (e.g., from about 0.02 to about 5, from about 0.03 to about 1, from about 0.04 to about 1, from about 0.05 to about 0.9, from about 0.1 to about 0.8, from about 0.1 to about 0.7, from about 0.1 to about 0.6, from about 0.1 to about 0.5, from about 0.1 to about 0.4). In particular, where less than a complete exchange of the native ligand is desired, the molar ratio of the exchange ligand to native ligand in the precursor metal-organic framework is advantageously below about 1. In the Examples, a MOF catalyst is identified in combination with this molar ratio as an "equivalent" or "eq." For example, the "0.4 eq." in "EMM-39(Zr) 0.4 eq." means that there is about 0.4 moles of the exchange ligand, 1,4-phenylenebisphosphonate, per mole of the native ligand, benzene-1,4-dicarboxylic acid.

Another example of suitable modified metal-organic framework for generating a MOF catalyst is, as denoted herein, EMM-39(Zr). EMM-39(Zr) is isostructural with zirconium 1,4-dicarboxybenzene (UiO-66). UiO-66 is a metal organic framework composed of $Zr_6O_4(OH)_4$ octahedra twelve-fold bonded to adjacent octahedra by 1,4-benzenedicarboxylate linking ligands. The properties of UiO-66 have been reported, for example, in the article Katz, M. J, et al., "A facile synthesis of UiO-66, UiO-67 and their derivatives", Chemical Communications, 2013, 49, 9449-9451. EMM-39(Zr) may be prepared by the methods disclosed in U.S. Publication No. 20180318816, which is incorporated herein with respect to its disclosure of the preparation of EMM-39(Zr). EMM-39(Zr) is characterized by $Zr_6O_4(OH)_4$ octahedra twelve-fold bonded to adjacent octahedra by one or more of a 1,4-benzenedicarboxylate linking ligand and a 1,4-phenylenebisphosphonate linking ligand. In EMM-39(Zr), the native ligand is 1,4-benzenedicarboxylate and the exchange ligand is 1,4-phenylenebisphosphonate. EMM-39(Zr) may be prepared using UiO-66 as precursor metal-organic framework and a source of 1,4-phenylenebisphosphonate to perform the ligand exchange. EMM-39(Zr) is isomorphous with UiO-66; however, EMM-39(Zr) may exhibit enhanced acid functionality arising from the exchanged diprotic phosphonic acid groups. By functionalizing one or more of the phenyl groups in a 1,4-phenylenebisphophonate linking ligand, such as with electron-withdrawing groups, the acidity of a MOF catalyst prepared therefrom may be adjusted to influence cracking activity. For example, the phenyl groups may be substituted with one or more halides (e.g., fluoro, chloro, bromo, iodo) or nitro groups.

Another example of suitable modified metal-organic framework for generating a MOF catalyst is, as denoted herein, EMM-39(Zr)F, which is characterized by $Zr_6O_4(OH)_4$ octahedra twelve-fold bonded to adjacent octahedra by one or more of a 1,4-benzenedicarboxylate linking ligand and a 1,4-perfluoro-phenylenebisphosphonate linking ligand. In preferred embodiments, at least about 5% of the 1,4-benzenedicarboxylate linking ligands are replaced by a 1,4-perfluoro-phenylenebisphosphonate linking ligand. EMM-39(Zr)F may be prepared using UiO-66 as precursor metal-organic framework and a source of perfluorinated 1,4-phenylenebisphosphonate as the exchange ligand.

Figure 2:
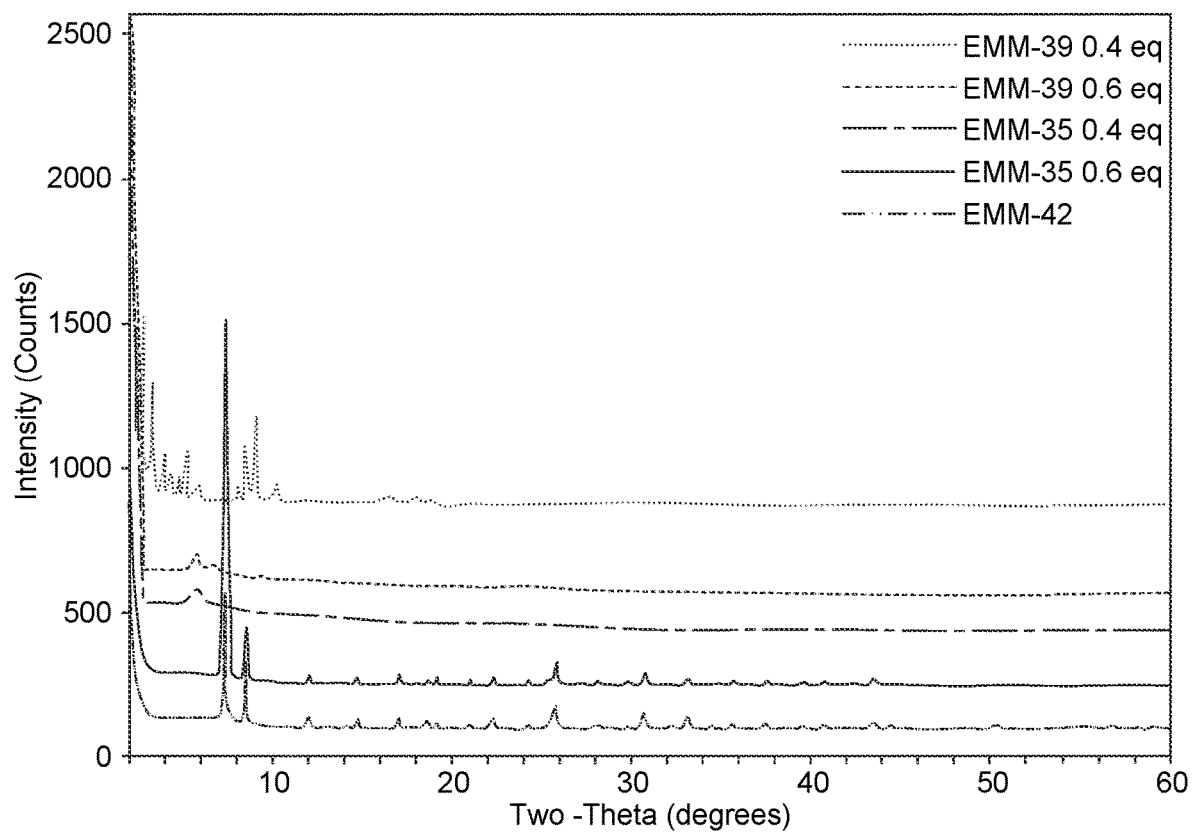
FIG. 2 provides several examples of X-ray powder diffraction patterns of several embodiments of the MOF catalysts disclosed herein.
Figure 3:
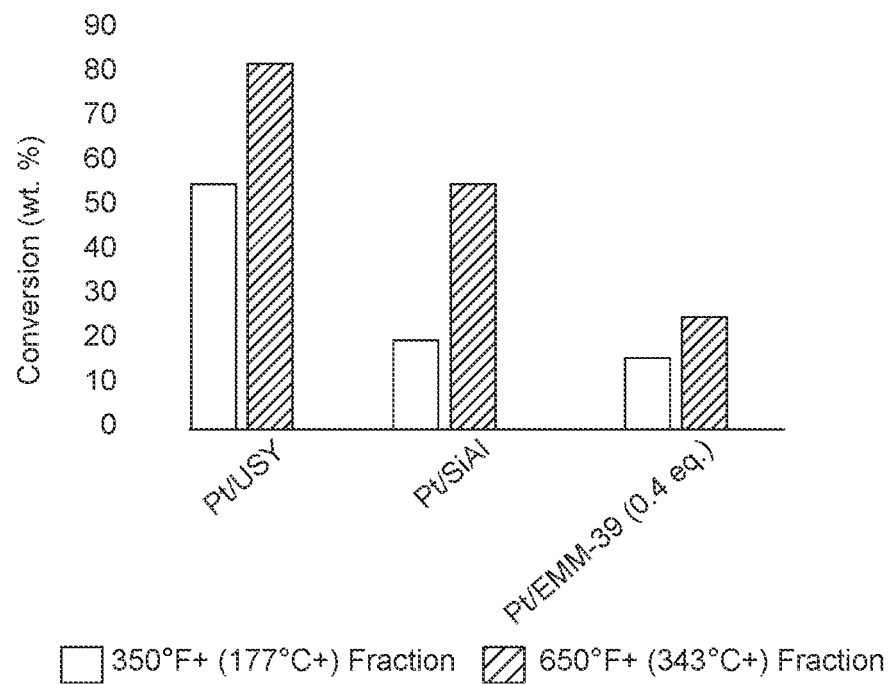
FIG. 3 provides data relating to the conversion activity of an embodiment of a MOF catalyst disclosed herein as it compares to USY zeolite and silica-alumina catalysts.

EMM-39(Zr)F may be characterized by a BET surface area ranging from about 330 $m^2/g$ to about 1000 $m^2/g$ and a pore volume ranging from about 0.125 cc/g to about 0.45 cc/g. EMM-39(Zr)F is isomorphous with EMM-39(Zr). PXRD patterns generated from samples EMM-39(Zr)F are shown in FIG. 2. The first two traces in ascending order represent EMM-39(Zr)F 0.4 eq. and EMM-39(Zr)F 0.6 eq., each impregnated with about 0.6% Pt.

Another example of suitable metal-organic framework for generating a MOF catalyst is, as denoted herein, EMM-35, which is isostructural with UiO-67. UiO-67 may be characterized by $Zr_6O_4(OH)_4$ octahedra twelve-fold bonded to adjacent octahedra by 4,4'-biphenyldicarboxylate linking ligands. The properties of UiO-67 have been reported, for example, in the article Katz, M. J, et al., "A facile synthesis of UiO-66, UiO-67 and their derivatives", Chemical Communications, 2013, 49, 9449-9451. EMM-35 may be prepared using UiO-67 as precursor metal-organic framework and a source of perfluoro-4,4'-biphenylbisphosphonate as the exchange ligand/s. Thus, EMM-35 may be characterized by $Zr_6O_4(OH)_4$ octahedra twelve-fold bonded to adjacent octahedra by one or more of a 4,4'-biphenyldicarboxylate linking ligand and a perfluoro-4,4'-biphenylbisphosphonate linking ligand. PXRD patterns generated from a sample of EMM-35 are shown in FIG. 2. The third and fourth traces in ascending order represent EMM-35 0.4 eq. and EMM-35 0.6 eq., each impregnated with about 0.6% Pt.

Another example of suitable metal-organic framework for generating a MOF catalyst is, as denoted herein, EMM-42 (Cr). EMM-42(Cr) is isostructural with MIL-101, which has been described previously, for example, by Bhattacharjee, S., et al. RSC Advances, 2014, 5, 52500-52525. MIL-101 is characterized by a metal-organic framework composed of trigonal nodes of three chromium and at least 13 oxygen atoms bridged by benzene-dicarboxylate linkages in the MTN (IZA code) topology. EMM-42(Cr), as prepared herein, may be characterized by trimeric chromium(III) octahedra clusters linked by one or more of a 1,4-benzenedicarboxylate linking ligand and a 1,4-phenylenebisphosphonate linking ligand. In preferred embodiments, at least about 5% of the 1,4-benzenedicarboxylate linking ligands are replaced with a 1,4-phenylenebisphosphonate linking ligand. EMM-42(Cr) may be prepared using MIL-101 as precursor metal-organic framework and 1,4-phenylenebisphosphonate as the exchange ligand/s. EMM-42(Cr) is isostructural and isomorphous with MIL-101(Cr) but may display enhanced acid functionality due to the exchanged diprotic phosphonic acid groups. EMM-42(Cr) may be further modified, for example, by functionalizing the phenyl groups of the 1,4-phenylenebisphosphonate linking ligands in EMM-42(Cr) with, for example, electron-withdrawing groups. For example, halides (e.g., fluoro, chloro, bromo, iodo) or nitro groups may be incorporated into the linking ligand.

Another example of suitable metal-organic framework for generating a MOF catalyst is, as denoted herein, EMM-42 (Cr)F. EMM-42(Cr)F is characterized by trimeric chromium (III) octahedra clusters linked by one or more of a 1,4-benzenedicarboxylate linking ligand and a perfluoro-1,4-phenylenebisphosphonate linking ligand. In preferred embodiments, at least 5% of the 1,4-benzenedicarboxylate linking ligands are replaced with a perfluoro-1,4-phenylenebisphosphonate linking ligand. EMM-42(Cr)F may be prepared using MIL-101(Cr) as a precursor MOF and a source of perfluorinated 1,4-phenylenebisphosphonate for the exchange ligand/s. U.S. Patent Application Publication No. 20180318817, which is hereby incorporated by reference with respect to its methods for making EMM-42(Cr)F, also describes methods for making EMM-42(Cr)F. EMM-42 (Cr)F is isomorphous with EMM-42(Cr). A PXRD pattern generated from a sample of EMM-42(Cr)F is shown in FIG. 2. The uppermost trace represents EMM-42(Cr)F 1.5 eq., impregnated with about 0.6% Pt.

It should be noted that the hydrocracking activity of the MOF catalysts disclosed herein and demonstrated in the Examples is remarkable as metal-organic framework is typically unstable in conditions routinely used in refinery processes. This is believed to be the first demonstration of a MOF-based catalyst in hydrocracking or any other standard refinery catalyst operation.

A modified metal-organic framework may be further treated with a metal source to associate said metal with the metal-organic framework structure and generate a MOF catalyst. The metal may be one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium. One of skill in the art will be familiar with suitable metal sources for associating the metal with the metal-organic framework. For example, suitable metal sources include, but are not limited to, platinum(II) acetylacetonate, platinum nitrate, platinum(II) chloride, platinum(IV) chloride, platinum(II) bromide, platinum(IV) bromide, platinum (II) iodide, platinum(IV) iodide, platinum(IV) oxide, chloroplatinic acid, tetraamineplatinum(II) chloride, tetraamineplatinum(II) hydroxide, tetraamineplatinum(II) nitrate, and trimethyl(methylcyclopentadienyl)platinum (IV). In preferred embodiments, the metal is a Group 10 metal (e.g., platinum, nickel, or palladium) and the source of the Group 10 metal is an acetylacetonate (e.g., platinum(II) acetylacetonate). The treating may include impregnation, cation exchange, or any method known in the art. The treating may be performed under conditions effective to associate said metal with the metal-organic framework structure at a concentration of 0.005 wt. % to about 5 wt. % based on the total weight of the MOF catalyst.

Optionally, but not necessarily, a MOF catalyst may be extruded with a binder. Examples of suitable binders include zeolites, polymers, other inorganic materials such as clays and metal oxides such as alumina, silica, silica-alumina, titania, zirconia, Group 1 metal oxides, Group 2 metal oxides, and combinations thereof. Clays may be kaolin, bentonite, and montmorillonite and are commercially available. They may be blended with other materials such as silicates. Other suitable binders may include binary porous matrix materials (such as silica-magnesia, silica-thoria, silica-zirconia, silica-beryllia and silica-titania), and ternary materials (such as silica-alumina-magnesia, silica-alumina-thoria and silica-alumina-zirconia).

A MOF catalyst extruded with a binder may include about 1 wt. % to about 10 wt. %, about 1 wt. % to about 20 wt. %, about 1 wt. % to about 30 wt. %, about 1 wt. % to about 40 wt. %, about 1 wt. % to about 50 wt. %, about 1 wt. % to about 60 wt. %, about 1 wt. % to about 70 wt. %, about 1 wt. % to about 80 wt. %, about 1 wt. % to about 90 wt. %, about 1 wt. % to about 99 wt. %, about 10 wt. % to about 20 wt. %, about 10 wt. % to about 30 wt. %, about 10 wt. % to about 40 wt. %, about 10 wt. % to about 50 wt. %, about 10 wt. % to about 60 wt. %, about 10 wt. % to about 70 wt. %, about 10 wt. % to about 80 wt. %, about 10 wt. % to about 90 wt. %, about 10 wt. % to about 99 wt. %, about 20 wt. % to about 30 wt. %, about 20 wt. % to about 40 wt. %, about 20 wt. % to about 50 wt. %, about 20 wt. % to about 60 wt. %, about 20 wt. % to about 70 wt. %, about 20 wt. % to about 80 wt. %, about 20 wt. % to about 90 wt. %, about 20 wt. % to about 99 wt. %, about 30 wt. % to about 40 wt. %, about 30 wt. % to about 50 wt. %, about 30 wt. % to about 60 wt. %, about 30 wt. % to about 70 wt. %, about 30 wt. % to about 80 wt. %, about 30 wt. % to about 90 wt. %, about 30 wt. % to about 99 wt. %, about 40 wt. % to about 50 wt. %, about 40 wt. % to about 60 wt. %, about 40 wt. % to about 70 wt. %, about 40 wt. % to about 80 wt. %, about 40 wt. % to about 90 wt. %, about 40 wt. % to about 99 wt. %, about 50 wt. % to about 60 wt. %, about 50 wt. % to about 70 wt. %, about 50 wt. % to about 80 wt. %, about 50 wt. % to about 90 wt. %, about 50 wt. % to about 99 wt. %, about 60 wt. % to about 70 wt. %, about 60 wt. % to about 80 wt. %, about 60 wt. % to about 90 wt. %, about 60 wt. % to about 99 wt. %, about 70 wt. % to about 80 wt. %, about 70 wt. % to about 90 wt. %, about 70 wt. % to about 99 wt. %, about 80 wt. % to about 90 wt. %, about 80 wt. % to about 99 wt. %, or about 90 wt. % to about 99 wt. % binder based on total weight of the MOF catalyst plus binder.

A MOF catalyst (including optional binder) may be calcined, reduced (e.g., in $H_2$), and/or sulfided according to methods well known in the art.

Unlike conventional hydrocracking catalysts, the MOF catalysts disclosed herein have the capacity to convert both 350° F.+(177° C.+) and 650° F.+(343° C.+) fraction of a hydrocarbon composition into high valued products. Further, the metal-organic framework forming the basis for a MOF-based catalyst may be easily modified to tune for specific desired activity (e.g., as demonstrated here, increasing acidity using electron-withdrawing groups). A highly versatile catalyst such as the MOF catalysts disclosed herein may better equip a refinery for effectively converting a wide range of feedstocks in an economically viable and profitable manner.

Example Embodiments

One nonlimiting example embodiment is a method for converting hydrocarbons comprising: providing a MOF catalyst comprising metal-organic framework; and contacting a hydrocarbon feed stream with the MOF catalyst under conditions effective to convert the hydrocarbon feed stream to a hydrocarbon product stream, the product stream being characterized by a $T_{95}$ distillation temperature that is lower than the $T_{95}$ distillation temperature of the hydrocarbon feed stream. Optionally, the embodiment may further include one or more of the following Elements: Element 1: the method wherein the hydrocarbon feed stream has a $T_5$ of at least 350° F. (176° C.); Element 2: the method wherein the conditions effective include a temperature of at least about 315° C. and a pressure of at least 1115 psig (7.688 MPa); Element 3: the method wherein the metal-organic framework has a structure characterized by a plurality of $Zr_6O_4(OH)_4$ octahedra bonded together with a plurality of organic linking ligands, each of the organic linking ligands being, independently, at least one of the following organic linking ligands: 1,4-phenylenebisphosphonate, 1,4-phenylenedicarboxylate, and phenyl-substituted derivatives thereof; Element 4: the method wherein the metal-organic framework has a structure characterized by a plurality of $Zr_6O_4(OH)_4$ octahedra bonded together with a plurality of organic linking ligands, each of the organic linking ligands being, independently, at least one of the following organic linking ligands: 4,4'-biphenylenebisphosphonate, 4,4'-biphenylenedicarboxylate, and phenyl-substituted derivatives thereof; Element 5: the method wherein the metal-organic framework is isostructural with UiO-67, UiO-66, or MIL-101; Element 6: Element 3 wherein one or more phenyl rings on the phenyl-substituted derivative is substituted with one or more electron-withdrawing groups; Element 7: Element 4 wherein one or more phenyl rings on the phenyl-substituted derivative is substituted with one or more electron-withdrawing groups; Element 8: Element 6 wherein the electron-withdrawing group comprises one or more of the following moieties: fluoro-, chloro-, bromo-, iodo-, and nitro; Element 9: Element 7 wherein the electron-withdrawing group comprises one or more of the following moieties: fluoro-, chloro-, bromo-, iodo-, and nitro-; Element 10: Element 3 wherein the method wherein the ratio of phosphonate to carboxylate in the metal-organic framework is from about 0.01:1 to about 10:1; Element 11: Element 4 wherein the method wherein the ratio of phosphonate to carboxylate in the metal-organic framework is from about 0.01:1 to about 10:1; Element 12: Element 3 wherein the ratio of phosphonate to carboxylate in the metal-organic framework is from about 0.2:1 to about 0.8:1; Element 13: Element 4 wherein the ratio of phosphonate to carboxylate in the metal-organic framework is from about 0.2:1 to about 0.8:1; Element 14: Element 3 wherein each of the organic linking ligands in the plurality of organic linking ligands, independently, includes at least one of the following organic linking ligands: perfluoro-1,4-phenylenebisphosphonate and 1,4-phenylenedicarboxylate; Element 15: Element 4 wherein each of the organic linking ligands in the plurality of organic linking ligands is, independently, at least one of the following organic linking ligands: perfluoro-4,4'-biphenylenebisphosphonate and 4,4'-biphenylenedicarboxylate; Element 16: the method wherein the MOF catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium; Element 17: the method wherein the metal is present in the MOF catalyst from about 0.05 wt. % to about 5 wt. %, based on the total weight of the MOF catalyst; Element 18: Element 17 wherein the metal comprises platinum; Element 19: the method wherein the conditions effective to convert the hydrocarbon feed stream to a hydrocarbon product stream comprise contacting the hydrocarbon feed stream with a source of hydrogen gas; and Element 20: the method wherein the MOF catalyst is one or more of platinum supported on EMM-35, platinum supported on EMM-39(Zr), and platinum supported on EMM-39(Zr)F. Examples of combinations include, but are not limited to, Element 1 in combination with one or more of Elements 2, 3, 5, 6, 8, 10, 12, 14, and 16-20; Element 1 in combination with one or more of Elements 2, 4, 5, 7, 9, 11, 13, and 15-20; Element 2 in combination with one or more of Elements 3, 5, 6, 8, 10, 12, 14, and 16-20; Element 2 in combination with one or more of Elements 4, 5, 7, 9, 11, 13, and 15-20; Element 3 in combination with one or more of Elements 5, 6, 8, 10, 12, 14, and 16-20; Element 4 in combination with one or more of Elements 5, 7, 9, 11, 13, and 15-20; Element 5 in combination with one or more of Elements 7, 9, 11, 13, and 15-20; Element 6 in combination with one or more of Elements 8, 10, 12, 14, and 16-20; Element 7 in combination with one or more of Elements 9, 11, 13, and 15-20; Element 8 in combination with one or more of Elements 10, 12, 14, and 16-20; Element 9 in combination with one or more of Elements 11, 13, and 15-20; Element 10 in combination with one or more of Elements 12, 14, and 16-20; Element 11 in combination with one or more of Elements 13, and 15-20; Element 12 in combination with one or more of Elements 14, and 16-20; Element 13 in combination with one or more of Elements 15-20; Element 14 in combination with one or more of Elements 16-20; Element 15 in combination with one or more of Elements 16-20; Element 16 in combination with one or more of Elements 17-20; Element 17 in combination with one or more of Elements 18-20; Elements 18 in combination with one or more of Elements 19-20; Element 19 in combination with Element 20; Element 3 in combination with Element 10; Element 4 in combination with Element 11; Element 3 in combination with Elements 6, 8, and 10; and Element 4 in combination with Elements 7, 9, and 11.

Another example of a nonlimiting example embodiment is a system for converting hydrocarbons comprising at least one reactor, the reactor comprising a hydrocarbon feed stream inlet arranged and configured to convey a hydrocarbon feed stream into the reactor; a hydrocarbon product stream outlet arranged and configured to convey a hydrocarbon product stream out of the reactor; and at least one catalyst bed comprising at least one MOF catalyst, wherein the MOF catalyst comprises a metal-organic framework. The embodiment may optionally include one or more of the following Elements: Element 21: the system wherein the metal-organic framework has a structure characterized by a plurality of $Zr_6O_4(OH)_4$ octahedra bonded together with a plurality of organic linking ligands, each of the organic linking ligands being, independently, at least one of the following organic linking ligands: 1,4-phenylenebisphosphonate, 1,4-phenylenedicarboxylate, and phenyl-substituted derivatives thereof; Element 22: the system wherein the metal-organic framework has a structure characterized by a plurality of $Zr_6O_4(OH)_4$ octahedra bonded together with a plurality of organic linking ligands, each of the organic linking ligands being, independently, at least one of the following organic linking ligands: 4,4'-biphenylenebisphosphonate, 4,4'-biphenylenedicarboxylate, and phenyl-substituted derivatives thereof; Element 23: Element 21 wherein one or more phenyl rings on the phenyl-substituted derivative is substituted with one or more electron-withdrawing groups; Element 24: Element 22 wherein one or more phenyl rings on the phenyl-substituted derivative is substituted with one or more electron-withdrawing groups; Element 25: Element 23 wherein the electron-withdrawing group comprises one or more of the following moieties: fluoro-, chloro-, bromo-, iodo-, and nitro-; Element 26: Element 24 wherein the electron-withdrawing group comprises one or more of the following moieties: fluoro-, chloro-, bromo-, iodo-, and nitro-; Element 27: Element 21 wherein the ratio of phosphonate to carboxylate in the metal-organic framework is from about 0.01:1 to about 10:1; Element 28: Element 22 wherein the ratio of phosphonate to carboxylate in the metal-organic framework is from about 0.01:1 to about 10:1; Element 29: Element 21 wherein the ratio of phosphonate to carboxylate in the metal-organic framework is from about 0.2:1 to about 0.8:1; Element 30: Element 22 wherein the ratio of phosphonate to carboxylate in the metal-organic framework is from about 0.2:1 to about 0.8:1; Element 31: Element 21 wherein each of the organic linking ligands in the plurality of organic linking ligands is, independently, one of the following organic linking ligands: perfluoro-1,4-phenylenebisphosphonate and 1,4-phenylenedicarboxylate; Element 32: Element 22 wherein each of the organic linking ligands in the plurality of organic linking ligands is, independently, at least one of the following organic linking ligands: perfluoro-4,4'-biphenylenebisphosphonate and 4,4'-biphenylenedicarboxylate; Element 33: the system wherein the MOF catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium; Element 34: Element 33 wherein the metal comprises platinum; Element 35: the system wherein the metal is present in the MOF catalyst from about 0.05 wt. % to about 5 wt. %, based on the total weight of the MOF catalyst; and Element 36: the system wherein the catalyst is one or more of platinum supported on EMM-35, platinum supported on EMM-39(Zr), and platinum supported on EMM-39(Zr)F.

Examples of combinations of Elements include, but are not limited to, Element 21 in combination with one or more of Elements 23, 25, 27, 29, 31, and 33-36; Element 22 in combination with one or more of Elements 24, 26, 28, 30, and 32-36; Element 23 in combination with one or more of Elements 25, 27, 29, 31, and 33-36; Element 24 in combination with one or more of Elements 26, 28, 30, and 32-36; Element 25 in combination with one or more of Elements 27, 29, 31, and 33-36; Element 26 in combination with one or more of Elements 28, 30, and 32-36; Element 27 in combination with one or more of Elements 29, 31, and 33-36; Element 28 in combination with one or more of Elements 30, and 32-36; Element 29 in combination with one or more of Elements 31 and 33-36; Element 30 in combination with one or more of Elements 32-36; Element 31 in combination with one or more of Elements 33-36; Element 32 in combination with one or more of Elements 33-36; Element 33 in combination with one or more of Elements 34-36; Element 34 in combination with one or more of Elements 35-36; Element 35 in combination with Element 36; Element 21 in combination with Elements 23, 25 and 27; and Element 12 in combination with Elements 24, 26, and 28.

In view of the above description and the Examples below, one of ordinary skill in the art will be able to practice the invention as claimed without undue experimentation. The foregoing will be better understood with reference to the following examples. All references made to these examples are for the purposes of illustration. The following examples should not be considered exhaustive, but merely illustrative of only a few of the many aspects and embodiments contemplated by the present disclosure.

EXAMPLES

Example 1: Preparation of EMM-35 0.6 Eq

EMM-35 was synthesized by suspending 5 grams of UiO-67 in 200 mL of dimethylsulfoxide. 4 grams of perfluorobiphenylbisphosphonic acid was added and the mixture stirred at 150° C. for 18 hours. The reaction was then filtered and re-suspended in dimethylsulfoxide and heated with stirring at 150° C. for an additional 18 hours. This washed material was then filtered and washed with acetone and then washed using a Soxhlet extractor with acetone for 3 hours. This material was then dried in a vacuum oven at 90° C. UiO-67 may be characterized by the PXRD peaks listed in Table 1 below:

TABLE 1

| Interplanar d-Spacing (Å) | °2θ | Relative Intensity (100 × I/I$_0$) |
| --- | --- | --- |
| 15.5197 | 5.690 | 100 |
| 13.4405 | 6.571 | 25.8 |
| 9.2980 | 9.298 | 1.9 |
| 8.1049 | 10.907 | 3.7 |
| 7.7599 | 11.394 | 11.3 |
| 6.7202 | 13.164 | 4.1 |
| 6.0108 | 14.726 | 0.9 |
| 5.4870 | 16.140 | 0.2 |
| 5.1732 | 17.126 | 1.9 |
| 4.7519 | 18.658 | 0.3 |
| 4.5437 | 19.521 | 2.1 |
| 4.4802 | 19.801 | 2.3 |
| 4.2502 | 20.883 | 0.2 |
| 4.0993 | 21.662 | 0.3 |

Example 2: Preparation of Pt/EMM-35 0.6 eq

This Dried Material of Example 4 was then impregnated with platinum(II) acetylacetonate ($Pt(AcAc)_2$). 800 mg of dried EMM-35 was weighed out and 19 mg of $Pt(AcAc)_2$ was dissolved in 1.5 grams of acetonitrile. This solution was dripped onto the dried EMM-35 while agitating it. When all the platinum solution was added, the sample was then dried again under air at 90° C.

Example 3: Preparation of Pt/EMM-39(Zr)F 0.6 eq

EMM-39(Zr)F was synthesized by suspending 10 grams of UiO-66 into 525 mL of dimethylsulfoxide along with 6.526 grams of perfluorobenzenebisphosphonic acid. The suspension was then stirred at 150° C. for 18 hours. The reaction was then filtered and re-suspended in dimethylsulfoxide and heated with stirring at 150° C. for an additional 18 hours. This washed material was then filtered and washed with acetone and then washed using a Soxhlet extractor with acetone for 3 hours. 1 gram of the oven dried material was then impregnated with 24 mg of Pt(AcAc)$_2$ dissolved in 1.75-2 grams of acetonitrile. The impregnated material was then dried in an oven at 90° C. UiO-66 may be characterized by the PXRD peaks listed in Table 2 below:

TABLE 2

| Interplanar d-Spacing (Å) | °2θ | Relative Intensity (100 × I/I$_0$) |
|---|---|---|
| 11.9879 | 7.368 | 100 |
| 10.3879 | 8.505 | 27.8 |
| 7.3361 | 12.054 | 9.4 |
| 6.2609 | 14.134 | 2.4 |
| 5.9979 | 14.758 | 0.9 |
| 5.1861 | 17.083 | 3.9 |
| 4.7557 | 18.643 | 3.9 |
| 4.6387 | 19.117 | 3.6 |
| 4.2350 | 20.959 | 1.8 |
| 3.9906 | 22.259 | 4.2 |
| 3.6645 | 24.269 | 1.3 |
| 3.5031 | 25.405 | 6 |
| 3.4570 | 25.750 | 15 |
| 3.1632 | 28.189 | 1.9 |

Example 4: Preparation of Pt/EMM-42(Cr)F 1.5 eq 1.75 Grams of MIL-101(Cr) was dispersed in 175 mL of DMSO and 3.5 grams of perfluoro-1,4-benzenebisphosphonic acid was added. The mixture was stirred at 150° C. for 18 hours. The reaction was then filtered and re-suspended in DMSO and heated with stirring at 150° C. for an additional 18 hours. This washed material was then filtered and washed with acetone and then washed using a Soxhlet extractor with acetone for 3 hours. 1 gram of the EMM-42(Cr)F sample was then impregnated in 25 mg of Pt(AcAc)$_2$ dissolved in 1.75-2 grams of acetonitrile. The samples were air-dried then heated to 90° C. MIL-10 may be characterized by the PXRD peaks listed in Table 3 below:

TABLE 3

| Interplanar d-Spacing (Å) | °2θ | Relative Intensity (100 × I/I$_0$) |
|---|---|---|
| 30.9764 | 2.850 | 33.2 |
| 26.7035 | 3.306 | 100 |
| 22.2394 | 3.970 | 21.2 |
| 20.3777 | 4.333 | 8.7 |
| 18.1352 | 4.869 | 18.2 |
| 17.0936 | 5.166 | 48.6 |
| 15.6749 | 5.634 | 19.9 |
| 14.9958 | 5.889 | 39.8 |
| 14.0302 | 6.295 | 2.3 |
| 13.5270 | 6.529 | 4.1 |
| 10.8524 | 8.140 | 8.9 |
| 10.4690 | 8.439 | 43.6 |
| 10.2609 | 8.611 | 21.2 |

Example 5: Preparation of Pt/UiO-67

UiO-67 was impregnated with Pt(AcAc)$_2$ in a similar fashion to EMM-35 as in Example 5.

Example 6: Hydrocarbon Feed Stream

To simulate a heavy feed that would be subjected to hydrocracking, a hydrotreated distillate product was blended with 20 wt. % of a Group III base stock. The boiling range of the resultant hydrocarbon feed stream is shown in Table 4 below. The hydrocarbon feed stream has <10 ppm sulfur and <5 ppm nitrogen (i.e., a sweet feedstock).

TABLE 4

| Boiling Fraction | Temperature |
|---|---|
| Initial BP | 131° C. (278° F.) |
| T$_5$ | 201° C. (394° F.) |
| T$_{10}$ | 223° C. (433° F.) |
| T$_{25}$ | 261° C. (502° F.) |
| T$_{50}$ | 301° C. (574° F.) |
| T$_{75}$ | 342° C. (648° F.) |
| T$_{90}$ | 378° C. (712° F.) |
| T$_{95}$ | 401° C. (754° F.) |
| T$_{99.5}$ | 497° C. (927° F.) |

A fixed-bed reactor was run at 1115 psig (7689 kPa) with a hydrogen flow equivalent to about 3000 scf/B (534.3 m$^3$/m$^3$). Temperatures were varied from 315° C. to 371° C. As understood by those of skill in the art, specifying an amount of conversion relative to a conversion temperature is a method for specifying the severity of reaction conditions independent of the nature of the particular feed. Thus, specifying an amount of conversion is commonly used as an alternative to specifying conditions such as temperature and pressure when specifying reaction severity. In this discussion, the amount of conversion relative to a conversion temperature (such as 177° C. or 343° C.) is defined based on the difference between the weight of the effluent that boils above the conversion temperature and the weight of the feed that boils above the conversion temperature. This difference is divided by the weight of the feed that boils above the conversion temperature to produce a normalized value (i.e., a weight percent based on the portion of the feed that boils above the conversion temperature). Catalysts prepared according to Examples 1-5 were run at the following space velocities:

Amorphous: Pt on Si/Al: 0.6 wt. % Pt, 1.65 hour$^{-1}$ WHSV
MOF: Pt/EMM-35, Pt/EMM-39(Zr)F, Pt/EMM-42(Cr)F, Pt/UiO-67: 0.6 wt. % Pt, 2.35 hour$^{-1}$ WHSV

Example 7

The hydrocarbon feed stream described in Table 4 is conveyed through a fixed-bed continuous flow reactor (about 1 g catalyst, WHSV listed above) held at about 315° C. using to demonstrate conversion of the 350° F.+(177° C.+) and 650° F.+(343° C.+) fractions of a hydrocarbon feed stream by one MOF catalyst, Pt/EMM-35. Results are shown in FIG. 2. In particular, while exhibiting lower conversion activity than Pt on Si/Al and Pt+USY zeolite, the fact that any activity is seen is promising and indicates that some MOFs may be used as hydrocracking catalysts.

Example 8

Figure 4:
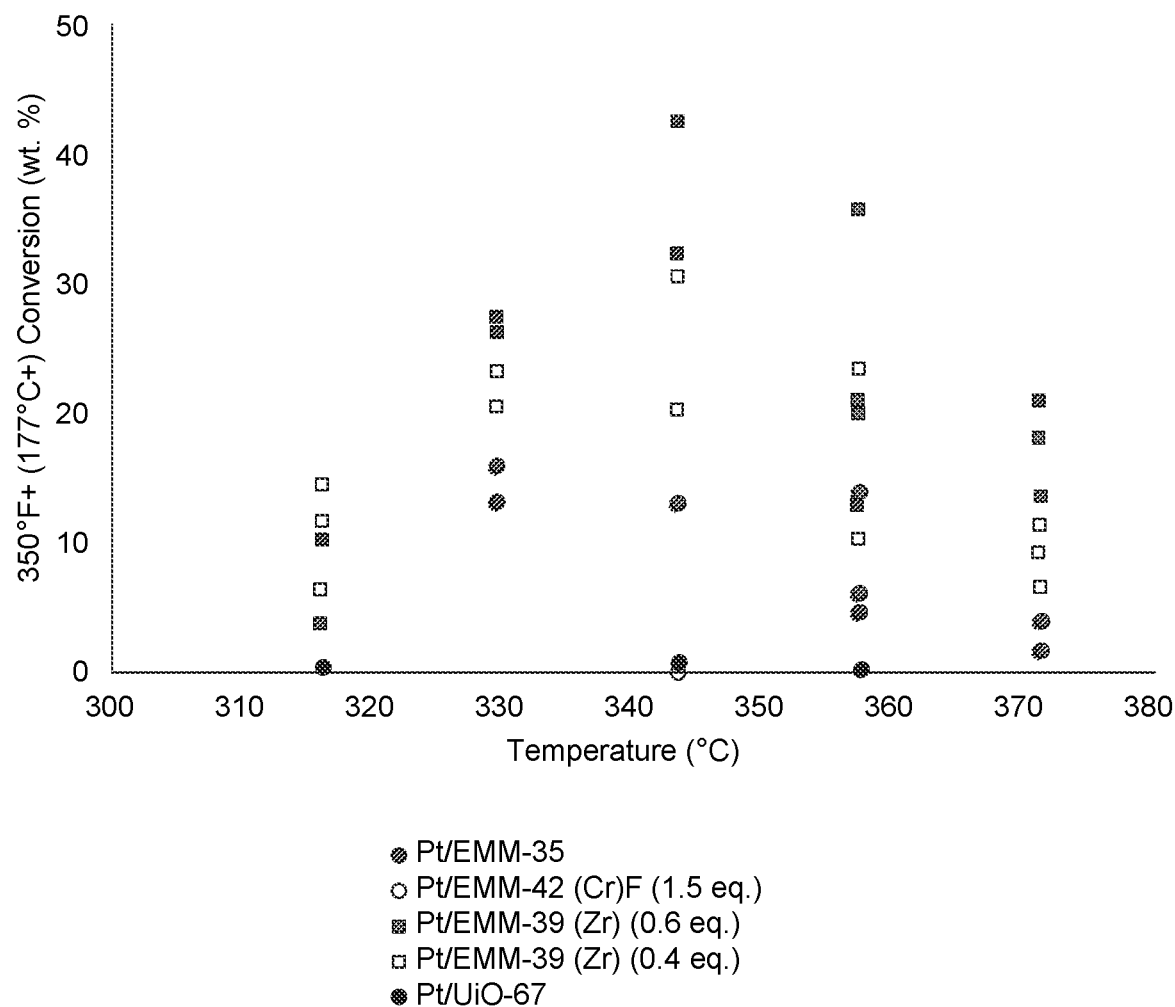
FIG. 4 presents data relating to the conversion of the 350° F.+ (177° C.+) fraction of a hydrocarbon feedstock as it relates to reactor temperature.

The hydrocarbon feed stream described in Table 4 is conveyed through a fixed-bed continuous flow reactor at various temperatures ranging from about 315° C. to about 370° C. to demonstrate conversion of the 350° F.+(177° C.+) fraction of a hydrocarbon feed stream across a range of temperatures (315° C. to 371° C.). Results are shown in FIG. 4. The effect of the organic linker exchange on conversion activity can be inferred from the data in FIG. 4. For example, a MOF catalyst containing an acid exchanged linker appears to demonstrate improved activity for catalytic hydrocracking compared to the MOF precursor, UiO-67. A MOF catalyst containing the fluorinated organic linker (Pt/EMM-39(Zr)F (0.6 eq.) and Pt/EMM-39(Zr)F (0.4 eq.)) appears to exhibit improved activity for catalytic hydrocracking as well. The effect of the metallic component of the MOF catalyst is also demonstrated, as the zirconium metal of EMM-39(Zr)F appears to enhance the cracking activity of EMM-35 while the chromium component of EMM-42(Cr)F appears to leave the MOF catalyst essentially inert.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

What is claimed is:

1. A method for converting hydrocarbons comprising:
providing a MOF catalyst comprising metal-organic framework, wherein the metal-organic framework has a structure characterized by a plurality of $Zr_6O_4(OH)_4$ octahedra bonded together with a plurality of organic linking ligands, each of the organic linking ligands being, independently, at least one of the following organic linking ligands: 1,4-phenylenebisphosphonate, 1,4-phenylenedicarboxylate, and phenyl-substituted derivatives thereof; and
contacting a hydrocarbon feed stream with the MOF catalyst under conditions effective to convert the hydrocarbon feed stream to a hydrocarbon product stream, the product stream being characterized by a $T_{95}$ distillation temperature that is lower than the $T_{95}$ distillation temperature of the hydrocarbon feed stream.

2. The method as in claim 1, wherein the hydrocarbon feed stream has a $T_5$ of at least 350° F. (176° C.).

3. The method as in claim 1, wherein the conditions effective include a temperature of at least about 315° C. and a pressure of at least 1115 psig (7.688 MPa).

4. The method as in claim 1, wherein one or more phenyl rings on the phenyl-substituted derivative is substituted with one or more electron-withdrawing groups.

5. The method as in claim 4, wherein the electron-withdrawing group comprises one or more of the following moieties: fluoro-, chloro-, bromo-, iodo-, and nitro-.

6. The method as in claim 1, wherein the molar ratio of phosphonate to carboxylate in the metal-organic framework is from about 0.01:1 to about 10:1.

7. The method as in claim 1, wherein the molar ratio of phosphonate to carboxylate in the metal-organic framework is from about 0.2:1 to about 0.8:1.

8. The method as in claim 1, wherein each of the organic linking ligands in the plurality of organic linking ligands, independently, includes at least one of the following organic linking ligands: perfluoro-1,4-phenylenebisphosphonate and 1,4-phenylenedicarboxylate.

9. The method as in claim 1, wherein the conditions effective to convert the hydrocarbon feed stream to a hydrocarbon product stream comprise contacting the hydrocarbon feed stream with a source of hydrogen gas.

10. A method for converting hydrocarbons comprising:
providing a MOF catalyst comprising metal-organic framework, wherein the metal-organic framework has a structure characterized by a plurality of $Zr_6O_4(OH)_4$ octahedra bonded together with a plurality of organic linking ligands, each of the organic linking ligands being, independently, at least one of the following organic linking ligands: 4,4'-biphenylenebisphosphonate, 4,4'-biphenylenedicarboxylate, and phenyl-substituted derivatives thereof; and
contacting a hydrocarbon feed stream with the MOF catalyst under conditions effective to convert the hydrocarbon feed stream to a hydrocarbon product stream, the product stream being characterized by a $T_{95}$ distillation temperature that is lower than the $T_{95}$ distillation temperature of the hydrocarbon feed stream.

11. The method as in claim 10, wherein each of the organic linking ligands in the plurality of organic linking ligands is, independently, at least one of the following organic linking ligands: perfluoro-4,4'-biphenylenebisphosphonate and 4,4'-biphenylenedicarboxylate.

12. A method for converting hydrocarbons comprising:
providing a MOF catalyst comprising metal-organic framework, wherein the metal-organic framework is isostructural with UiO-67, UiO-66, or MIL-101; and
contacting a hydrocarbon feed stream with the MOF catalyst under conditions effective to convert the hydrocarbon feed stream to a hydrocarbon product stream, the product stream being characterized by a $T_{95}$ distillation temperature that is lower than the $T_{95}$ distillation temperature of the hydrocarbon feed stream.

13. A method for converting hydrocarbons comprising:
providing a MOF catalyst comprising metal-organic framework, wherein the MOF catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium; and
contacting a hydrocarbon feed stream with the MOF catalyst under conditions effective to convert the hydrocarbon feed stream to a hydrocarbon product stream, the product stream being characterized by a $T_{95}$ distillation temperature that is lower than the $T_{95}$ distillation temperature of the hydrocarbon feed stream.

14. The method as in claim 13, wherein the metal comprises platinum.

15. The method as in claim 13, wherein the metal is present in the MOF catalyst from about 0.05 wt. % to about 5 wt. %, based on the total weight of the MOF catalyst.

16. A method for converting hydrocarbons comprising:
providing a MOF catalyst comprising metal-organic framework wherein the catalyst is one or more of platinum supported on EMM-35, platinum supported on EMM-39(Zr), and platinum supported on EMM-39 (Zr)F; and contacting a hydrocarbon feed stream with the MOF catalyst under conditions effective to convert the hydrocarbon feed stream to a hydrocarbon product stream, the product stream being characterized by a $T_{95}$ distillation temperature that is lower than the $T_{95}$ distillation temperature of the hydrocarbon feed stream.

17. A system for converting hydrocarbons comprising three stages comprising:
a pre-treatment stage comprising at least one selected from a hydrotreatment reactor, a sorbent, an aromatic saturation catalyst, or any combination thereof;
a treatment stage comprising at least one reactor, the reactor comprising:
a hydrocarbon feed stream inlet arranged and configured to convey a hydrocarbon feed stream into the reactor;
a hydrocarbon product stream outlet arranged and configured to convey a hydrocarbon product stream out of the reactor; and
at least one catalyst bed comprising at least one MOF catalyst, wherein the MOF catalyst comprises a metal-organic framework, wherein the metal-organic framework has a structure characterized by a plurality of $Zr_6O_4(OH)_4$ octahedra bonded together with a plurality of organic linking ligands, each of the organic linking ligands being, independently, at least one of the following organic linking ligands: 1,4-phenylenebisphosphonate, 1,4-phenylenedicarboxylate, 4,4'-biphenylenebisphosphonate, 4,4'-biphenylenedicarboxylate and phenyl-substituted derivatives thereof; and
a post-treatment stage comprising a separation stage to separate the hydrocarbon product stream into two or more fractions comprising a lubricant fraction, a distillate fuel fraction, LPG, naphtha, a $C_{4-}$ fraction, a $C_{5+}$ fraction, and any blend thereof.

18. The system as in claim 17, wherein one or more phenyl rings on the phenyl-substituted derivative is substituted with one or more electron-withdrawing groups.

19. The system as in claim 18, wherein the electron-withdrawing group comprises one or more of the following moieties: fluoro-, chloro-, bromo-, iodo-, and nitro-.

20. The system as in claim 17, wherein the molar ratio of phosphonate to carboxylate in the metal-organic framework is from about 0.01:1 to about 10:1.

21. The system as in claim 17, wherein the molar ratio of phosphonate to carboxylate in the metal-organic framework is from about 0.2:1 to about 0.8:1.

22. The system as in claim 17, wherein each of the organic linking ligands in the plurality of organic linking ligands is, independently, one of the following organic linking ligands: perfluoro-1,4-phenylenebisphosphonate and 1,4-phenylenedicarboxylate.

23. The system as in claim 17, wherein each of the organic linking ligands in the plurality of organic linking ligands is, independently, at least one of the following organic linking ligands: perfluoro-4,4'-biphenylenebisphosphonate and 4,4'-biphenylenedicarboxylate.

24. The system as in claim 17, wherein the MOF catalyst further comprises one or more of the following metals: a Group 2 metal, a Group 3 metal, a Group 4 metal, a Group 5 metal, a Group 6 metal, a Group 7 metal, a Group 8 metal, a Group 9 metal, a Group 10 metal, a Group 11 metal, a Group 12 metal, a Group 13 metal, a Group 14 metal, a Group 15 metal, a lanthanide, yttrium, and scandium.

25. The system as in claim 24, wherein the metal comprises platinum.

26. The system as in claim 24, wherein the metal is present in the MOF catalyst from about 0.05 wt. % to about 5 wt. %, based on the total weight of the MOF catalyst.

27. The system as in claim 17, wherein the MOF catalyst is one or more of platinum supported on EMM-35, platinum supported on EMM-39(Zr), and platinum supported on EMM-39(Zr)F.

* * * * *